United States Patent Office 3,674,493
Patented July 4, 1972

3,674,493
PHOTOGRAPHIC ELEMENTS CONTAINING
FLUORESCENT BRIGHTENING AGENTS
Roy A. Jeffreys and David A. Thomas, Hatch End, England, assignors to Eastman Kodak Company, Rochester, N.Y.
No Drawing. Filed Apr. 3, 1970, Ser. No. 25,567
Int. Cl. G03c 1/92
U.S. Cl. 96—72          15 Claims

ABSTRACT OF THE DISCLOSURE

Photographic elements comprising a white reflecting support provided with a fluorescent brightening agent having the formula:

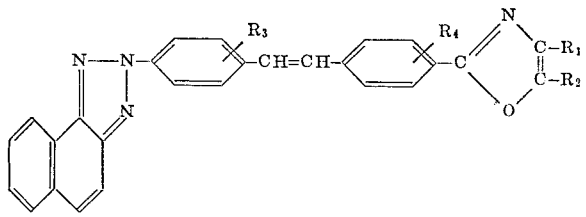

wherein $R_1$ and $R_2$ are selected from the group consisting of hydrogen, alkyl and aryl

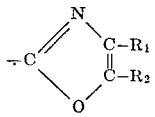

collectively, represents a benzoxazolyl nucleus and $R_3$ and $R_4$ each represents hydrogen, hydroxy or acyloxy.

---

This invention relates to photographic elements containing certain fluorescent compounds. In one aspect, the invention is concerned with photographic black and white and color print materials exhibiting enhanced whiteness in the low density regions of the images formed.

When paper supports are coated with a photographic emulsion, the surface color of the photographic paper is not completely white and even the white areas in the photographic images obtained upon the supports will often continue to absorb a considerable amount of light. This coloration depends on various factors such as the reflecting power of the support, the quality of the gelatin layer on the support and the presence of other addenda in the photographic layers. Discoloration may also occur through the formation of colored decomposition products in the photographic layers during processing.

It has been proposed to eliminate this problem by adding to the support or layers superimposed thereon, dyestuffs or pigments which absorb in the range of long-wave-lengths, so that the spectral character of the reflected visible light is equal to that of the incident visible light and the support, consequently showing a neutral tone. Unfortunately, the incident light in these methods is not completely reflected but partly absorbed by the support and dyestuffs or pigments and consequently, even the whitest areas in the photographic image will not completely reflect the visible light.

More recently, it has been proposed to add certain substantially colorless blue-fluorescing, ultraviolet absorbing compounds, commonly referred to as optical bleaching agents, to the supports or to layers coated thereon. These compounds absorb ultraviolet-light radiation of between about 3,000 angstrom units and 4,000 angstrom units and emit fluorescent light of between 4,000 angstrom units and 5,500 angstrom units and are commonly referred to as optical bleaching agents. Although certain of these optical agents have proved satisfactory for use in photographic elements, providing a neutral image tone with strong reflecting power of the white areas in the photographic image, others have failed for one reason or another. For instance, many compounds known to be effective as optical brighteners in synthetic fibers have proven unsatisfactory for use in photographic elements. In view of the relatively small group of fluorescent brightening agents known to be satisfactory for use in photographic elements, any new compounds suitable for this use come as a welcomed contribution to the art.

It is an object of the invention, therefore, to provide novel photographic elements containing certain compounds as fluorescent brightening agents.

It is also an object of the invention to provide a photographic element capable of forming photographic black and white or color prints exhibiting increased whiteness in the low density regions of the images formed.

Another object of the invention is to provide photographic color prints having compounds incorporated in at least one of the sensitized layers thereof which compounds have ultraviolet-light absorption characteristics that protect any dye images developed in layers below the layer in which the compounds are incorporated.

These and other objects of the invention are obtained by a photographic element comprised of a white reflecting support provided with a fluorescent brightening agent having the formula:

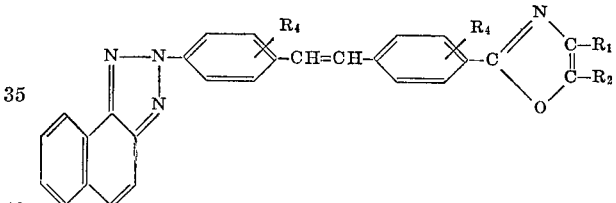

wherein $R_1$ and $R_2$ are selected from the group consisting of hydrogen, alkyl and aryl

collectively, represents a benzoxazolyl nucleus and $R_3$ and $R_4$ each represents hydrogen hydroxy or acyloxy. The aromatic rings in the structure represented above may also be substituted, if desired, with one or more substituents such as aryl, aralkyl, alkyl, alkoxy, aryloxy, amino, cyano, carboxyl, amido, ester,

$CH_3CO—$, $CF_3$, $(CH_3)_2NSO_2—$ groups or halogen atoms, (e.g. chlorine or bromine).

Illustrative of fluorescent brightening agents for use in the present invention are 4-[benzoxazol-2-yl]-4'-[naphtho(1,3-d)triazol-2-yl] stilbene;
4-[benzoxazol-2-yl]-3'-hydroxy-4'-[naphtho(1,2-d)-triazol-2-yl]stilbene;
3'-acetoxy-4-[benzoxazol-2-yl]-4-naphtho(1,2-d)triazol-2-yl]stilbene;
4-[benzoxazol-2-yl]-3-hydroxy-4'-[naphtho(1,2-d) triazol-2-yl]stilbene;
3-acetoxy-4-[benzoxazol-2-yl]-4'-naphtho(1,2-d) triazol-2-yl]stilbene, etc.

Preparation of the fluorescent brightening agent may be accomplished by any of the methods known in the art. The working examples below will illustrate convenient methods for the synthesis of the compounds.

In carrying out the invention, the fluorescent brightening agents may be incorporated in the support itself or in any of the layers commonly provided on photographic supports. Thus, the brightening agents may be added to a layer between the silver halide emulsion layer and the support, an interlayer between two silver halide emulsion layers, a layer coated over the emulsion layer, e.g. a protective layer, or to at least one silver halide emulsion layer. The photographic element may be non-light sensitive, as well as light-sensitive, and includes non-light sensitive elements such as receiving sheets used in the silver salt diffusion transfer process or the various color image transfer processes described in the prior art as, for example, U.S. Pats. Nos. 2,352,014; 2,543,181; 2,584,030; 2,983,606; 3,087,817; 3,227,550; 3,227,551 and British Pat. No. 1,057,433, all of which are hereby incorporated by reference. Incorporation of the fluorescent brightening agents may be accomplished by adding the brightening agents to the support or the material to be coated on the support as a layer in a finely divided form. It is preferable, however, to first dissolve or disperse the agents in a suitable inert organic solvent, such as methanol, pyridine and the like and then to incorporate the resulting solution or dispersion throughout the layer-forming material.

The proportion of the fluorescent brightening agents in the support or layer required to achieve the optimum advantages of the invention will vary depending primarily on the support employed and/or the particular constitution of the layer into which the brightening agent is incorporated. As a general rule, about 5 to 25% by weight of the layer or support into which it is incorporated will suffice, although larger or smaller amounts can be employed.

Preparation of supports into which have been incorporated the brightening agents and application of coating materials containing the incorporated brightening agents to the support may be effected by techniques well known in the photographic arts and need no further elaboration herein. Likewise, the development of the photographic elements to photographic prints forms no part of the invention and can be any of the processes well known in the art for the particular photographic element being processed.

The supports utilized in the preparation of the photographic elements of the invention can be any of the supports commonly used in the preparation of photographic elements provided they possess a white reflecting surface. Thus, by "white reflecting support" as used herein and in the appended claims is meant any photographic support either possessing a naturally white reflecting surface or provided with a white reflective surface or layer, such as a white-pigmented coating, etc. Typical supports include, for instance, paper, cellulose nitrate film, cellulose ester film, polyvinyl acetate film, polystyrene film, poly (ethylene terephthalate) film, glass, metal and the like. Supports such as paper coated with α-olefin polymers, particularly polymers of α-olefins of two or more carbon atoms as exemplified by polyethylene, polypropylene, ethylene-butene copolymers and the like can be employed.

Various silver salts such as silver bromide, silver iodide, silver chloride, silver chlorobromide or silver bromoiodide can be used as the light-sensitive salt in the emulsion layers or layers of the photographic element. The silver halides can be those which form latent images predominantly on the surface of the silver halide grains or those which form latent images inside the silver halide crystals such as described in U.S. Pat. No. 2,592,250 of Davey and Knott.

Silver halide emulsion layers of a photographic element can contain any of the hydrophilic, water-permeable binding materials suitable for this purpose. Suitable materials include gelatin, colloidal albumin, polyvinyl compounds, cellulose derivatives, acrylamide polymers, etc. Mixtures of these binding agents can also be used. The binding agents for the emulsion layer of the photographic element can contain dispersed polymerized vinyl compounds. Such compounds are disclosed, for example, in U.S. Pat. Nos. 3,142,568 of Nottorf issued July 28, 1964; 3,193,386 of White issued July 6, 1965; 3,062,674 of Houck, Smith and Yudelson issued Nov. 6, 1962; 3,220,844 of Houck, Smith and Yudelson issued Nov. 30, 1965; and include the water-insoluble polymers of alkyl acrylates and methacrylate, acrylic acid, sulfoalkyl acrylates and the like.

The silver halide emulsion layer or layers of the photographic element may also contain conventional addenda such as gelatin plasticizers, coating aids, and hardeners such as aldehyde hardeners, e.g. formaldehyde, mucochloric acid, glutaraldehyde bis(sodium bisulfite), maleic dialdehyde, aziridines, dioxane derivatives and oxypolysaccharides. Spectral sensitizers which also can be used include the cyanines, merocyanines, styryls, and hemicyanines. Sensitizing dyes useful in sensitizing such emulsions are described, for example, in U.S. Pat. Nos. 2,526,632 of Brooker and White issued Oct. 24, 1950 and 2,503,776 of Sprague issued Apr. 11, 1950.

As aforementioned, the fluorescent brightening agents may be utilized in brightening the white areas of the developed images in the usual black and white and colored photographic print materials. Typical color photographic print material comprises a white reflecting support carrying three silver halide emulsion layers, each layer sensitized respectively to the red, green and blue regions of the spectrum. As aforementioned, the present invention contemplates dispersing the fluorescent brightening agent into any one or more of the sensitized layers, as well as into sublayers, interlayers and protective layers. Photographic color prints made in the foregoing materials show enhanced whiteness in the low density regions of images formed in them. In addition, the inherent ultraviolet absorption characteristics of the fluorescent brightening agents protects any dye images developed in the layers below the one in which they are incorporated.

The following examples are included to illustrate the preparation of the fluorescent brightening agents employed in the present invention.

EXAMPLE I

4-[benzoxazol-2-yl]-4'-[naphtho(1,2-d)triazol-2-yl] stilbene 2-(p-tolyl)naphtho(1,2-d)triazole was prepared by diazotising p-toluidine, coupling with 2-naphthylamine and oxidizing the intermediate 1-(p-tolylazo) - 2 - naphthylamine with copper sulphate pentahydrate in boiling aqueous pyridine according to the method reported in Chem. Listy., 1958, 52, 1156 (Chem. Abs., 1958, 52, 17245).

2 - (4 - bromomethylphenyl)naphtho(1,2-d)triazole: A mixture of 2 - (p - tolyl)naphtho(1,2-d)triazol (21.5 g.), recrystallized N-bromosuccinimide (15.8 g.) and benzoyl peroxide (0.8 g.) was suspended in carbon tetrachloride (145 ml.) and heated under reflux for 16 hours. The carbon tetrachloride was evaporated under reduced pressure and the solid residue washed several times with boiling water, collected by filtration and dried in vacuo. The crude product, M.P. 222–225° C. was recrystallized from benzene to give white needles (17.1 g., 61%), M.P. 230–233° C. Analysis.—Found (percent): C, 59.9; H, 3.80; Br, 23.2; N, 12.6. $C_{17}H_{12}BrN_3$ requires (percent): C, 60.4; H, 3.58; Br, 23.6; N, 12.4.

4 - [naphtho(1,2 - d)triazol - 2 - yl]benzaldehyde: Hexamethylene tetramine (2.15 g.) was dissolved in boiling chloroform (25 ml.) and the solution was added to 2 - (4 - bromomethylphenyl)naphtho(1,2-d)triazol (5.1 g.) contained in a 250 ml. flask and the mixture was heated under reflux for 16 hours. The quaternary ammonium salt which had separated was collected by filtration and air dried. The salt was dissolved in 50% aqueous acetic acid (50 ml.) and heated under reflux for 1 hour. A solution of concentrated hydrochloric acid (3 ml.) in water (10 ml.) was added and the mixture heated for 10 minutes, allowed to cool and the solid (3.94 g., 96%), M.P. 203–210° C., was collected and recrystallized from acetic acid to give white prisms, M.P. 207–208° C. The 2,4 - dinitrophenylhydrazone (orange-red crystals from dioxan) had a melting point of more than 310° C. Found (percent): C, 60.8; H, 3.61; N, 21.0. $C_{23}H_{15}N_7O_4$ requires (percent): C, 60.9; H, 3.31; N, 21.6%.

2 - (4 - bromomethylphenyl)benzoxazole: A mixture of 2-(p-tolyl) benzoxazole (52.3 g.), recrystallized N-bromosuccinimide (50 g.) and benzoyl peroxide (2.5 g.) was suspended in carbon tetrachloride (500 ml.) and heated under reflux with stirring for 5 hours. The carbon tetrachloride was evaporated under reduced pressure and the solid residue washed several times with boiling water, collected by filtration and air dried. The crude product was recrystallized from ethyl acetate to give cream needles (51 g., 72%), M.P. 173–175° C.

Diethyl p - (benzoxazol - 2-yl)benzyl-phosphonate: A mixture of 2-(4-bromomethylphenyl)benzoxazole (28.8 g.) and triethyl phosphite (18.3 g.) was heated in an oil bath at 140–150° C. for 3 hours until evolution of ethyl bromide had ceased. The remaining volatile impurities were removed by heating the mixture at 100° C./0.1 mm. for 2 hours. The residual viscous oil was kept at 5° C. overnight and gave a waxy pale yellow solid (35 g.), which was ground with petroleum ether (B.P. 60/60° C.) and the product collected and dried in vacuo to give a white solid (31.5 g., 91%), M.P. 81–84° C.

4 - [benzoxazol - 2 - yl] - 4' - [naphtho(1,2 - d)triazol-2-yl]stilbene: Diethyl p-(benzoxazol-2-yl)benzylphosphonate (10.4 g.) was added portionwise to a slurry of sodium hydride (50% dispersion in mineral oil, 1.44 g.) in 1,2-dimethoxyethane (60 ml.) and the mixture stirred at room temperature for 15 minutes until gas evolution had ceased. 4-[naphtho(1,2-d)triazol-2-yl]benzaldehyde (4.1 g.) was then added portionwise, and effervescence occurred and the temperature rose to ca. 35° C. The stirred suspension was heated slowly to 70° C. and maintained at this temperature for 2 hours, concentrated to about one-third its volume, cooled and diluted with water (200 ml.). A fine yellow solid separated and this was collected, air dried and recrystallized from chloroform to give a yellow microcrystalline solid (4.1 g., 60%), a melting point of more than 310° C. Found (percent): C, 80.3; H, 4.30; N, 12.1 $C_{31}H_{20}N_4O$ requires (percent): C, 80.1; H, 4.34; N, 12.1.

EXAMPLE II

4-[benzoxazol-2-yl]-3'-hydroxy-4'-[naphtho(1,2-d)triazol-2-yl]stilbene 4-nitro-3-hydroxytoluene was prepared by nitration of m-cresol in glacial acetic acid at 0° according to the procedure reported in Helv. Chim. Acta., 1935, 18, 1343.

4-amino-3-hydroxytoluene was prepared by reduction of 4-nitro-3-hydroxytoluene with sodium hydrosulphite according to the method reported in J. Amer. Chem. Soc., 1930, 52, 3978.

1-(2-hydroxy-4-methylphenylazo)-2-naphthylamine: 4-amino-3-hydroxytoluene (24.6 g.) was suspended in a mixture of glacial acetic acid (80 ml. and ice (60 g.) in an atmosphere of nitrogen, cooled to 5 to 10° C. and diazotised by the addition over one and one-half hours of a solution of sodium nitrite (14.5 g.) in water (30 ml.). Meanwhile, a suspension was prepared by dissolving 2-naphthylamine (24.7 g.) in hot glacial acetic acid (60 ml.) and cooling the mixture rapidly in ice to 10° C. The diazonium salt solution was filtered in an atmosphere of nitrogen and added rapidly to the stirred suspension. A red-brown precipitate formed immediately and the mixture was stirred at 10–20° C. for 5 hours and the azo dye (42.3 g., 90%), M.P. 202–206° C. collected by filtration, washed thoroughly with water and dried in vacuo. Recrystallization from methanol gave lustrous deep red needles, M.P. 219–220° C. Found (percent): C, 73.7; H, 5.50; N, 15.2. $C_{17}H_{15}N_3O$ requires (percent) C, 73.6; H, 5.42; N, 15.2.

2-(2-hydroxy-4-methylphenyl)naphtho(1,2 - d)triazole: 1-(2-hydroxy-4-methylphenylazo)-2 - napthylamine (27.7 g.) was dissolved in pyridine (250 ml.) and copper sulphate pentahydrate solution (250 ml., 1 molar) added with stirring and the mixture heated under reflux for 2 hours until the dye color had been discharged. The light-brown suspension was cooled to ca. 80° C., sodium sulphide (59.5 g.) added carefully and the black suspension allowed to cool to room temperature (ca. 2 hours). The mixture was diluted with an equal volume of water and the black solid collected by filtration and the damp cake transferred to a Soxhlet extractor and continuously extracted with chloroform (1.5 litres) for 3 hours, and the orange extract dried (MgSO$_4$) and concentrated in vacuo to give a light-brown solid (26.2 g., 95%), M.P. 159–164° C. Recrystallization from ethyl acetate gave white needles, M.P. 165–168° C. Found (percent): C, 74.2; H, 4.84; N, 15.3. $C_{17}H_{13}N_3O$ requires (percent): C, 74.2; H, 4.73; N, 15.3.

2-(2-acetoxy-4-methylphenyl)naptho(1,2-d)triazole: 2-(2-hydroxy-4-methylphenyl)naphtho(1,2-d)triazole (26.2 g.) was dissolved in acetic anhydride (260 ml.) and pyridine (260 ml.) by warming gently for 5 minutes. The mixture was left to stand at room temperature overnight, poured into ice-water (ca. 2 litres) and extracted with chloroform (1.5 litres). The extract was washed with water, dried (MgSO$_4$) and evaporated at reduced pressure to give a light-brown solid which was recrystallized from methanol, after treatment with charcoal to give white prisms (23.6 g., 78%), M.P. 126–128° C. Found (percent): C, 72.1; H, 4.85; N, 13.4. $C_{19}H_{15}N_3O_2$ requires (percent): C, 71.9; H, 4.76; N, 13.2.

3 - hydroxy - 4 - [naphtho(1,2 - d)triazol - 2 - yl]benzaldehyde: A mixture of 2-(2-acetoxy-4-methylphenyl) naptho(1,2-d) triazole (31.7 g.) recrystallized N-bromosuccinimide (19.2 g.) and benzoyl peroxide (1 g.) was suspended in carbon tetrachloride (500 ml.) and heated under reflux for 16 hours, chilled at 5° C. for 2 hours and the succinimide filtered off. The filtrate was evaporated under reduced pressure and gave the bromo-methyl derivative as a viscous orange oil (39 g.), which solidified on standing at 5° C. The crude bromo-methyl compound (39 g.) was treated with a solution of hexamethylene-tetramine (14 g.) in chloroform (120 ml.) and the mixture heated under reflux for 16 hours and then evaporated under reduced pressure to give the guaternary ammonium salt as a brown solid. The salt was dissolved in hot glacial acetic acid (500 ml.), water (100 ml.) added and the mixture heated under reflux for one-half hour. Concentrated hydrochloric acid (50 ml.) was added and the mixture boiled for another 15 minutes, cooled and the pale yellow solid (22 g., 76%), M.P. 160–164° C., collected and dried in vacuo. Found (percent): C, 70.5; H, 4.24; N, 14.2. $C_{17}H_{11}N_3O_2$ requires (percent): C, 70.6; H, 3.83; N, 14.5. The 2,4-dinitrophenylhydrazone (orange microcrystals) had a melting point of more than 300° C. Found (percent): N, 20.2. $C_{23}H_{15}N_7O_5$ requires (percent): N, 20.9.

4 - [benzoxazol - 2 yl] - 3 - hydroxy - 4' - [naphtho(1,2-d) triazol-2-yl]stilbene: Diethyl p-benzoxazol-2-yl)benzylphosphonate (10.4 g.) was added portionwise to a slurry of sodium hydride (50% dispersion in mineral oil, 1.44 g.) in 1,2-dimethoxyethane (60 ml.) and the mixture stirred at room temperature for 15 minutes until gas evolution had ceased. 3-hydroxy-4-[naphtho(1,2-d)triazol-2-yl]benzaldehyde (4.34 g.) was then added portionwise, and effervescence occurred and the temperature rose to ca. 35° C. The stirred suspension was heated slowly to 70° C. and maintained at this temperature for 3 hours concentrated to about one-third its volume, cooled to room temperature and diluted with water (200 ml.). A pale yellow solid separated and this was collected, finely ground and leached with boiling ethyl acetate (250 ml.) and the solid (5.9 g. 82%), melting point of more than 320° C., was collected and dried.

EXAMPLE III

3'-acetoxy-4-[benzoxazol-2-yl]-4'-[naphtho(1,2-d) triazol-2-yl]stilbene

A suspension of 4-[benzoxazol-2-yl]-3-hydroxy-4'-[naphtho(1,2-d)triazol-2-yl]stilbene (1.5 g.) in pyridine (15 ml.) and acetic anhydride (15 ml.) was heated on a steambath for 15 minutes and then allowed to stand at room temperature overnight. The mixture was poured into ice-water (250 ml.), extracted with chloroform and the extract dried ($MgSO_4$) and evaporated under reduced pressure. The residual solid was leached several times with boiling ethyl acetate to give a yellow microcrystalline solid (0.93 g., 56%), M.P. 265–268° C. Found (percent): N, 10.5; $C_{33}H_{22}N_4O_3$ requires (percent): N, 10.7.

EXAMPLE IV

4-[benzoxazol-2-yl]-3-hydroxy-4'-[naphtho(1,2-d) triazol-2-yl]stilbene 2-(2-hydroxy-4-methylphenyl)benzoxazole: An intimate mixture of 2 - hydroxy - 4 - methylbenzoic acid (60.8 g., 0.4 mole) and o-aminophenol (43.6 g., 0.4 mole) was added portionwise with stirring to polyphosphoric acid (800 g.) at 70° C. for 1 hour. When the addition was complete, the mixture was heated at 170° C. for 1 hour, cooled to ca. 100° C. and poured into ice-water (4 litres). The crude product (74 g., 83%), M.P. 148–150° C., was collected, washed thoroughly with water, dried and recrystallized from methanol to give white needles, M.P. 150–152° C. Found (percent): C, 74.7; H, 4.92; N, 6.2; $C_{14}H_{11}NO_2$ requires (percent): C, 74.7; H, 5.02; N, 6.3.

2-(2-acetoxy - 4 - methylphenyl)benzoxazole: 2-(2-hydroxy-4-methylphenyl)benzoxazole (74 g.) was dissolved in pyridine (740 ml.) and the mixture left to stand overnight at room temperature. The solution was poured into water (5 litres) and the gummy solid extracted with chloroform. The extract was washed with water, dried ($MgSO_4$) and concentrated in vacuo to give a tacky solid. Recrystallization from cyclohexane gave white prisms (45 g., 59%), M.P. 80–84° C. A further recrystallization raised the melting point to 88–90° C. Found (percent): C, 71.8; H, 5.07; N, 5.3. $C_{16}H_{13}NO_3$ requires (percent): C, 71.9; H, 4.90; N, 5.2.

2-(2-acetoxy - 4 - bromomethylphenyl)benzoxazole: A mixture of 2-(2-acetoxy - 4 - methylphenyl)benzoxazole (26.7 g., 0.1 mole), recrystallized N-bromosuccinimide (19.2 g., 0.11 mole) and benzoyl peroxide (1 g.) was suspended in carbon tetrachloride (500 ml.) and boiled under reflux for 16 hours, cooled and filtered to remove the succinimide which had been formed. The filtrate was concentrated in vacuo and the residue recrystallized from cyclohexane to give white needles (20 g., 58%), M.P. 140–143° C., raised to 142–144° C. on recrystallization from methanol. Found (percent): C, 55.5; H, 3.58; N, 4.2; Br, 23.6. $C_{16}H_{12}BrNO_3$ requires (percent): C, 55.5; H, 3.50; N, 4.0; Br, 23.1.

2-(2-hydroxy - 4 - formylphenyl)benzoxazole: Hexamethylenetetramine (12.4 g.) was dissolved in boiling chloroform (200 ml.) and the solution added to 2-(2-acetoxy-4-bromomethylphenyl)benzoxazole (27.7 g., 0.08 mole) and the mixture heated under reflux for 16 hours. The mixture was concentrated to half its volume, diluted with ether (400 ml.) and the quaternary ammonium salt collected and air dried. The salt (30.5 g., 73%) was dissolved in 50% aqueous acetic acid (80 ml.) and heated under reflux for 1 hour. Concentrated hydrochloric acid (20 ml.) in water (120 ml.) was added, and the mixture heated for one-half hour. The solid (11.5 g., 60%), M.P. 144–148° C. which separated on cooling was collected and air dried. Found (percent): C, 70.0; H, 4.03; N, 5.9. $C_{14}H_9NO_3$ requires (percent): C, 70.3; H, 3.79; N, 5.9. The 2,4-dinitrophenylhydrazone (orange-red prisms from pyridine) had a melting point of more than 300° C. Found (percent): C, 57.0; H, 3.34; N, 16.4. $C_{20}H_{13}N_5O_6$ requires (percent): C, 57.3; H, 3.12; N, 16.7.

Diethyl p - [naphtho(1,2-d)triazol-2-yl]benzylphosphonate: A mixture of 2-(4-bromomethylphenyl)naphtho(1,2-d)triazole (16.9 g., 0.05 mole, see Example I) and triethyl phosphite (9.2 g.) was heated in an oil bath at 180–200° C. for 3 hours until evolution of ethyl bromide had ceased. The remaining volatile impurities were removed by heating the mixture at 100° C./0.1 mm. for 2 hours. The residual viscous oil was triturated with petroleum ether (B.P. 60/80° C.) and left at 5° C. for several days, and the tacky solid (17.5 g., 89%), M.P. 51–53° C. collected and air dried. Recrystallization from ether/petroleum ether (B.P. 60/80° C.) gave white prisms, M.P. 61–64° C. Found (percent): C, 63.6; H, 5.75; N, 10.5; P, 8.0. $C_{21}H_{22}N_3O_3P$ requires (percent): C, 63.7; H, 5.61; N, 10.6; P, 7.8.

4-[benzoxazol-2-yl]-3-hydroxy - 4' - [naphtho(1,2-d) triazol-2-yl]stilbene: Diethyl p-[naphtho(1,2-d)triazol-2-yl]benzylphosphonate (15.8 g., 0.04 mole) was added portionwise to a slurry of sodium hydride (50% dispersion in mineral oil, 1.92 g.) in 1,2-dimethoxyethane (80 ml.) and the mixture stirred at room temperature for 15 minutes until gas evolution had ceased. 2-(2-hydroxy-4-formylphenyl)benzoxazole (4.78 g., 0.02 mole) was added portion wise and effervescence occurred and the temperature rose to ca. 35° C. The suspension was heated slowly to 70° C. and maintained at this temperature for 2 hours, concentrated to about one-third its volume, cooled to room temperature and diluted with water (200 ml.). The resulting pale yellow solid (9.5 g., 98%), melting point of more than 315° C., was collected, washed with water, dried and recrystallized from pyridine to give yellow needles, M.P. of more than 320° C. Found (percent): C, 77.6; H, 4.50; N, 12.0. $C_{31}H_{20}N_4O_2$ requires (percent): C, 77.5; H, 4.20; N, 11.7.

EXAMPLE V 3-acetoxy-4-[benzoxazol-2-yl]-4'-[naphtho(1,2-d) triazol-2-yl]stilbene A suspension of 4-[benzoxazol - 2 - yl]-3-hydroxy-4'-[naphtho(1,2-d)triazol-2-yl]stilbene (3 g.) in pyridine (30 ml. and acetic anhydride (30 ml.) was heated on the steam bath for one-quarter hour and then left at room temperature overnight. The mixture was poured into ice-water (500 ml.) and the pale yellow solid (2.6 g., 80%), M.P. 265–270° C. collected, dried and recrystallized from pyridine/methanol (1:1) to give fine yellow needles, M.P. 273–276° C. Found (percent): C, 76.1; H, 4.49; N, 10.8. $C_{33}H_{22}N_4O_3$ requires (percent): C, 75.8; H, 4.24; N, 10.7.

The following example is included to further illustrate preparation of the photographic elements of the invention.

EXAMPLE VI

A color print material is prepared as described in Example 2 of U.S. Pat. No. 2,956,879, hereby incorporated by reference, except that the fluorescent brightening agent of Example I, i.e. 4-[benzoxazol-2-yl]-4'-[naphtho(1,2-d) triazol-2-yl]stilbene, is added to each of the solutions which upon coating comprise the interlayers between the emulsion layers and also the top coat layer. The amount of the brightening agent added in each case is about 7% by weight of the respective layer.

The color paper exposed and developed as described in said example provides color prints exhibiting enhanced whiteness in the low density regions of images formed in them.

Similar results are obtained substituting the brightening agents of Examples II and IV above for 4-[benzoxazol-2-yl]-4'-[naphtho(1,2-d)triazol-2-yl]stilbene.

It is claimed:

1. A photographic element comprising a silver halide layer, a white reflecting support and a fluorescent brightening agent having the formula:

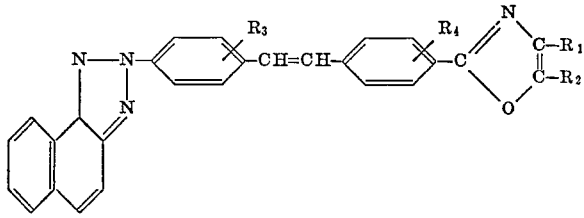

wherein each of $R_1$ and $R_2$ separately is hydrogen or alkyl or when linked together in

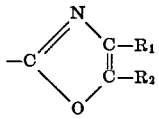

completes a benzoxazolyl nucleus and $R_3$ and $R_4$ each represents hydrogen, hydroxy or acyloxy.

2. The photographic element of claim 1 wherein said brightening agent is provided in said support.

3. The photographic element of claim 1 wherein the brightening agent is provided in at least one layer carried by said support.

4. The photographic element of claim 1 wherein the fluorescent brightening agent is present in said silver halide layer in an amount of about 5 to 25% weight of the said silver halide layer.

5. The photographic element of claim 1 wherein the fluorescent brighteining agent is 4-[benzoxazol-2-yl]-4'-[naphtho(1,2-d)triazol-2-yl]stilbene.

6. The photographic element of claim 1 wherein the fluorescent brightening agent is 4-[benzoxazol-2-yl]-3'-hydroxy-4'-[naphtho(1,2-d)triazol-2-yl]stilbene.

7. The photographic element of claim 1 wherein the fluorescent brightening agent is 3'-acetoxy-4-[benzoxazol-2-yl]-4'-[naphtho(1,2-d)triazol-2-yl]stilbene.

8. The photographic element of claim 1 wherein the fluorescent brightening agent is 4-[benzoxazol-2-yl]-3-hydroxy-4'-[naphtho(1,2-d)triazol-2-yl]stilbene.

9. The photographic element of claim 1 wherein the fluorescent brightening agent is 3-acetoxy-3-[benzoxazol-2-yl]-4'-[naphtho(1,2-d)triazol-2-yl]stilbene.

10. A color photographic element comprising a white reflecting support carrying silver halide emulsion layers sensitized respectively to the red, green and blue regions of the spectrum, at least one of said emulsion layers being provided with a fluorescent brightening agent having the formula:

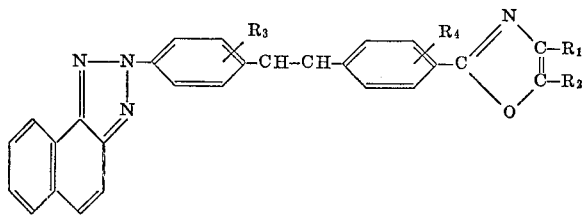

wherein each of $R_1$ and $R_2$ separately is hydrogen or alkyl or when linked together in

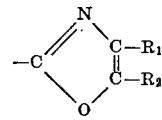

completes a benzoxazolyl nucleus and $R_3$ and $R_4$ each represents hydrogen, hydroxy or acyloxy.

11. The photographic element of claim 10 wherein the fluorescent brightening agent is 4-[benzoxazol-2-yl]-4'-[naphtho(1,2-d)triazol-2-yl]stilbene.

12. The photographic element of claim 10 wherein the fluorescent brightening agent is 4-[benzoxazol-2-yl]-3'-hydroxy-4'-[naphtho(1,2-d)triazol-2-yl]stilbene.

13. The photographic element of claim 10 wherein the fluorescent brightening agent is 3'-acetoxy-4-[benzoxazol-2-yl]-4'-[naphtho(1,2-d)triazol-2-yl]stilbene.

14. The photographic element of claim 10 wherein the fluorescent brightening agent is 4-[benzoxazol-2-yl]-3-hydroxy-4'-[naphtho(1,2-d)triazol-2-yl]stilbene.

15. The photographic element of claim 10 wherein the fluorescent brightening agent is 3-acetoxy-4-[benzoxaol-2-yl]-4'-[naphtho(1,2-d)triazol-2-yl]stilbene.

References Cited

UNITED STATES PATENTS 3,401,048  9/1968  Okubo et al. _____ 117—33.5 T

FOREIGN PATENTS 749,899  1/1967  Canada _____ 96—82

RONALD H. SMITH, Primary Examiner

U.S. Cl. X.R.

96—76, 82; 117—33.5 T